United States Patent [19]

Lagadec

[11] Patent Number: 5,065,260
[45] Date of Patent: Nov. 12, 1991

[54] METHOD FOR RECORDING/REPRODUCING EXPANDED DIGITAL SIGNALS IN CONVENTIONAL FORMAT

[75] Inventor: Roger Lagadec, Kanagawa, Japan

[73] Assignee: Sony Corporation, Tokyo, Japan

[21] Appl. No.: 300,028

[22] Filed: Jan. 19, 1989

[30] Foreign Application Priority Data

Jan. 22, 1988 [JP] Japan .................................. 63-12254

[51] Int. Cl.$^5$ .............................................. G11B 5/09
[52] U.S. Cl. ........................................ 360/32; 360/48
[58] Field of Search ................... 360/32, 22, 24, 48, 360/40

[56] References Cited

U.S. PATENT DOCUMENTS

| | | | |
|---|---|---|---|
| 4,229,808 | 10/1980 | Hui ........................................ | 360/48 |
| 4,622,598 | 11/1986 | Doi et al. ............................. | 360/32 |
| 4,697,212 | 9/1987 | Osawa et al. ......................... | 360/32 |
| 4,704,640 | 11/1987 | Okamoto et al. ..................... | 360/48 |
| 4,730,223 | 3/1988 | Ikeda et al. ........................... | 360/40 |

FOREIGN PATENT DOCUMENTS 0323119 12/1988 European Pat. Off. .

OTHER PUBLICATIONS

An Audio Engineering Society Preprint No. 2322(B3), Mar. 4–7, 1986, New York: pp. 1–9, Y. Ishida et al.: "A Professional Use 2-Channel Digital Audio Recorder Adopting an Improved Signal Format".

An Audio Engineering Society Preprint No. 2323(B4), Mar. 4–7, 1986, New York: pp. 1–14, A. Weisser et al.: "Description of a New Format for Digital Audio-Tape Recording with Stationary Heads".

The BKSTS Journal, vol. 66, No. 4, Apr. 1984, London, Great Britain, pp. 162–167, J. R. Watkinson: "DASH Format and the PCM-3324".

Primary Examiner—Aristotelis Psitos
Assistant Examiner—Varsha V. Sheladia
Attorney, Agent, or Firm—Philip M. Shaw, Jr.

[57] ABSTRACT

A method for recording/reproducing digital signals is provided in which each unit of digital data for each channel is constituted by m bit of standard data and n bits of expansion data, the data of each channel are separated into the above standard data and expansion data, the standard data and the expansion data are distributed to different recording tracks and a multiple track recording is performed by stationary heads, so that the data of each channel may be expanded and the m-bit standard data and the n-bit expasion data for each channel may be handled separately from each other.

12 Claims, 8 Drawing Sheets

METHOD FOR RECORDING/REPRODUCING EXPANDED DIGITAL SIGNALS IN CONVENTIONAL FORMAT

BACKGROUND OF THE INVENTION

This invention relates to a method for recording/reproducing digital signals and, more particularly, to a method for recording/reproducing digital signals, in which multiple tracks are formed by stationary heads.

As a method for recording digital signals, such as pulse code modulated (PCM) audio signals, there is known a multiple track recording method in which digital signals of one or more channels are recorded by a stationary head so as to be distributed to plural tracks formed along the longitudinal direction of magnetic tape.

As shown for example in the Japanese Patent Publication KOKAI NOS. 104714/1984 or 145768/1986, assigned to the present Assignee, PCM audio signals, obtained by quantization into 16 bits at a sampling frequency of 32 kHz, 44.1 kHz, 48 kHz or 50.4 kHz, are selectively recorded on required ones of, for example, 8 to 48 tracks on the tape as a function of the number of channels or tape running speeds.

In a recording apparatus for these PCM audio signals, there is a demand for an increased dynamic range of the audio signals or an increased performance in data processing. For example, it is desired to enhance the word length of the recording data, so as to expand the number of quantization bits from 16 to 20 bits or record auxiliary data other than the PCM audio signals.

However, an increase in the number of bits of the words recorded in pre-existing formats for expanding the word length of the data means an increase in the recording density resulting in the necessity of elevating the tape running speed and completely modifying the pre-existing data processing system. The recording/reproducing apparatus having the format modified in this manner is disadvantageous in that it is unable to reproduce tapes recorded in accordance with the pre-existing formats, and in that, conversely, a tape recorded in accordance with the modified format is unable to be reproduced by the conventional reproducing apparatus.

OBJECT AND SUMMARY OF THE INVENTION

It is therefore a principal object of the present invention to provide a method for recording/reproducing digital signals free of the aforementioned drawbacks of the prior art system.

It is another object of the present invention to provide a method for recording/reproducing digital signals wherein extended data can be handled with assuarance of compatibility.

It is another object of the present invention to provide a method for recording/reproducing digital signals wherein extended data may include auxiliary data.

According to the method of the present invention, m-bit standard data and n-bit expansion data constituting one-channel data are separated from each other and recorded in a distributed fashion on different recording tracks so that the m-bit standard data can be expanded by the n-bit expansion data and the standard and expansion data can be handled independently of each other.

The above and other objects and technical features of the invention will become apparent from the drawings and the appended claims.

DETAILED DESCRIPTION OF THE PREFERRED EMBODIMENTS

By referring to the accompanying drawings, the method for recording/reproducing digital signals in accordance with an embodiment of the present invention will be explained in detail.

Figure 1:
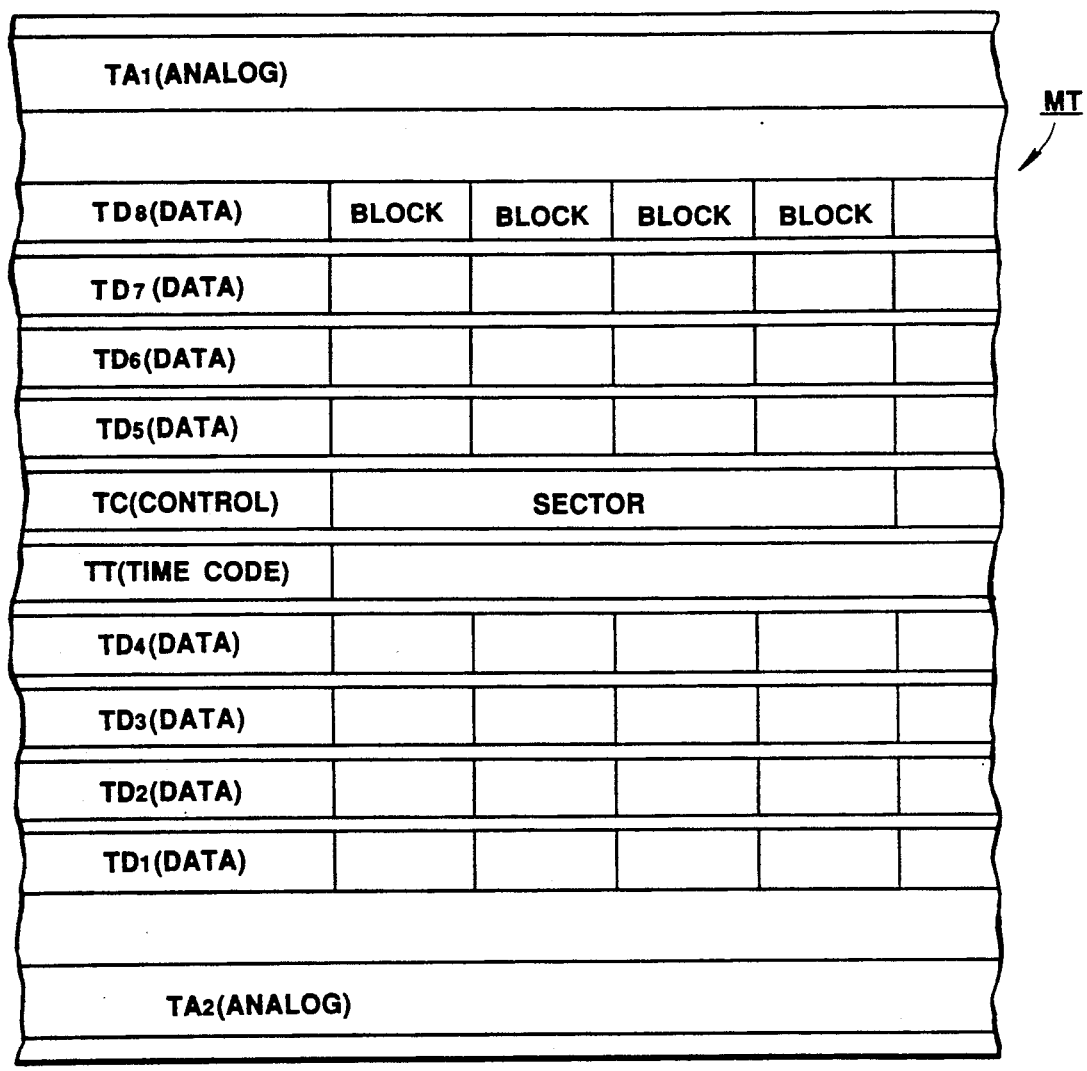
FIG. 1 is a diagrammatic view showing the pattern of recording tracks defined on a magnetic tape in a recording/reproducing method for digital signals according to an embodiment of the present invention.

FIG. 1 shows a magnetic tape MT of, for example, ¼ inch in width, on which eight digital audio signal tracks $TD_1$ to $TD_8$, for example, are arrayed across the tape width and extend along the tape length On these tracks, one or a plurality of channels of PCM audio signals are recorded selectively.

At the center of the width of the tape MT, there are formed a time code signal track TT and a control signal track TC between the digital audio signal tracks $TD_5$ and $TD_4$.

On the time code signal track TT, there are recorded, for example, SMPTE time code signals. On the control signal track TC, there are recorded address data indicating the absolute addresses along the length of the magnetic tape MT and format identification data indicating the recording formats of the digital audio signals recorded on the digital audio signal tracks $TD_1$ to $TD_8$, along with sync signals, as sectors each having a predetermined length.

On the edges of the magnetic tape MT, there are defined two analog audio signal tracks $TA_1$ and $TA_2$, on which analog audio signals corresponding to the digital audio signals recorded on the digital audio signal tracks $TD_1$ to $TD_8$ are recorded with a bias or as pulse width modulated (PWM) signals.

Alternatively the above time code signal track TT and control signal track TC may be defined on an edge of the tape MT, similarly to the analog audio signal tracks $TA_1$ and $TA_2$. Since these tracks TT and TC are not directly relevant to the present invention, the corresponding description is omitted for simplicity.

On the digital audio signal tracks $TD_1$ to $TD_8$ on the magnetic tape MT, digital signals formed into blocks each including plurality words are modulated in accordance with a predetermined rule and are recorded serially. The length of the block is such that four blocks correspond to each sector of the control signal track TC.

Figures 2A, 2B:
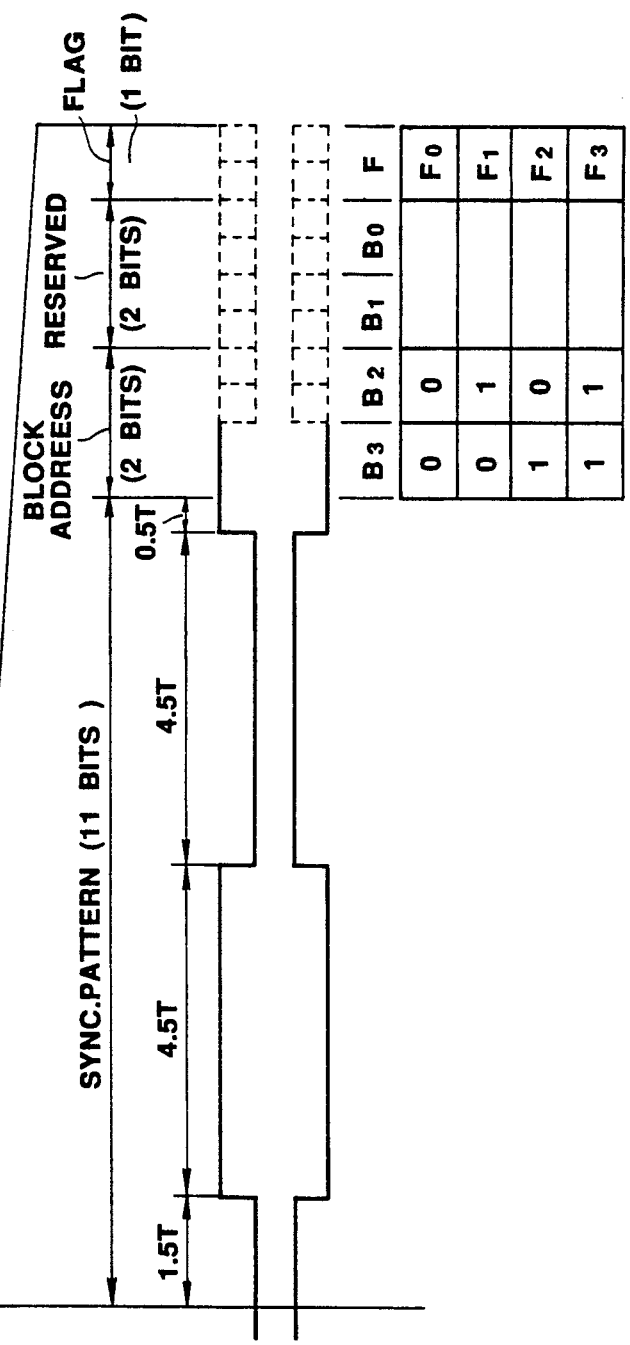
FIGS. 2A and 2B are diagrammatic views showing the construction of a data block on the recording tracks shown in FIG. 1, and the sync signal pattern therefore, respectively.

Referring to FIG. 2A, each block is made up of a block sync signal, shown in more detail in FIG. 2B, 16-word digital data contiguous thereto and 16-bit redundancy data of the cyclic redundancy check code (CRCC) generated from the above 16-word digital data and from a portion of the block sync signal.

As shown in FIG. 2B, the block sync signal is made up of a 11-bit sync pattern having two transition distances of 4.5 T violating the modulation rule, preceded and followed by distances of 1.5 T and 0.5 T respectively, where T stands for the length of a bit cell, a block address of 2 bits, a reserved area of 2 bits and a flag bit following the sync pattern in this order. The aforementioned address is changed so as to be repeated at intervals of four blocks and is combined with the sector address recorded in the control signal track TC to indicate the absolute addresses. The flag bit $F_0$ in the block having the address of (00) indicates whether the original analog signal of the PCM audio signal for the track is subjected to emphasis or not.

The CRCC is generated from the 16-word digital data headed by the block address.

The 16 words of digital data included in this block is formed by 12 words of original digital data and 4 words of redundancy data for error correction. Each word of the 12 words is formed by 16-bit PCM audio data, upper order bits of the 20 bit PCM audio data, or 16-bit data constituted of 4 lower order bits of the 20-bit PCM audio data, and 4-bit auxiliary data, as described later in detail.

Figure 3:
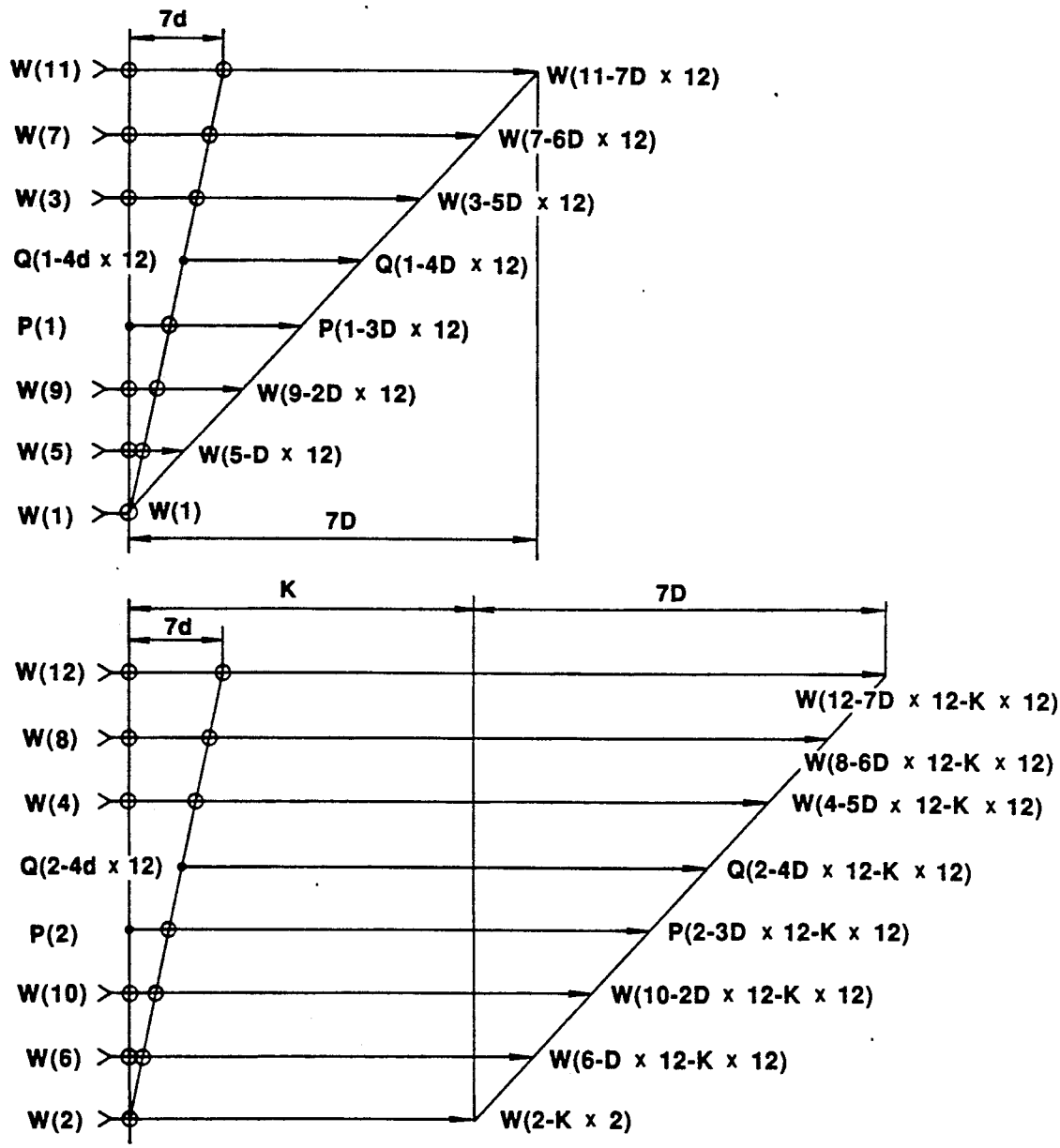
FIG. 3 is a diagrammatic view showing the manner of generating error correction words included in the data block shown in FIG. 2A.
Figure 4:
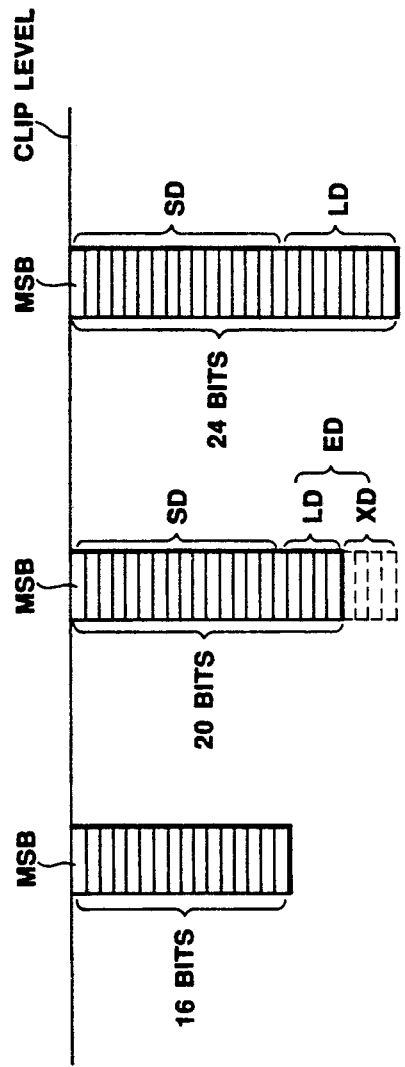
FIG. 4 is a diagrammatic view for illustrating the data construction for expanding the audio data in the recording/reproducing method according to an embodiment of the present invention.

The 4 words of redundancy data for error correction are generated as shown in FIG. 3. Thus a sequence of input digital data, with regard to one track, to encode for the error correction code is divided at intervals of 12 words, W(n) (n=1, 2, ..., 12) and separated into an odd-numbered word sequence and an even-numbered word sequence. A parity word P(1) constituting a first error correction code is generated from, e.g., the six odd numbered words. The seven words, inclusive of the parity word P(1), are interleaved so that they are separated by d blocks from one another, to generate a parity word Q constituting a second error correction code. The eight words, inclusive of this parity word Q, are further interleaved so that they are separated by D blocks from one another, at the same time that the even-numbered word sequence, also including error correction codes, is delayed by k blocks with respect to the odd-numbered word sequence. Thus, the digital data included in each block are formed by 16 words as shown in FIG. 2A.

The above is described in detail in the above aforementioned Japanese Patent Publications KOKAI Nos. 104714/1984 and 145768/1986 so that the detailed description is not made herein for simplicity.

Assuming that a magnetic tape of ¼ inch wide as is used as the magnetic tape MT, channel allocation to the digital audio signal tracks $TD_1$ to $TD_8$ of the magnetic tape MT is defined with sampling frequency, tape running speed and the number of channels as the parameters for the sampling frequency of 48 kHz, as shown in the following Table 1.

TABLE 1

| format | F | M | T | X | S |
|---|---|---|---|---|---|
| tape speed (cm/s) | 76.20 | 38.10 | 38.10 | 38.10 | 19.05 |
| number of channels | 8 | 4 | 2 | 2 | 2 |
| number of tracks occupied per channel | 1 | 2 | 4 | 2 + (2) | 4 |
| track $TD_1$ | $CH_1$ | $CH_1$-A | $CH_1$-A | $CH_1$-A | $CH_1$-A |
| track $TD_2$ | $CH_2$ | $CH_2$-A | $CH_2$-A | $CH_2$-A | $CH_2$-A |
| track $TD_3$ | $CH_3$ | $CH_3$-A | $CH_1A'$ | Extension | $CH_1$-C |
| track $TD_4$ | $CH_4$ | $CH_4$-A | $CH_2$-A' | Parity | $CH_2$-C |
| track $TD_5$ | $CH_5$ | $CH_1$-B | $CH_1$-B | $CH_1$-B | $CH_1$-B |
| track $TD_6$ | $CH_6$ | $CH_2$-B | $CH_2$-B | $CH_2$-B | $CH_2$-B |
| track $TD_7$ | $CH_7$ | $CH_3$-B | $CH_1$-B' | Extension | $CH_2$-D |
| track $TD_8$ | $CH_8$ | $CH_4$-B | $CH_2$-B' | Parity | $CH_2$-D |

That is to say, in the format F(fast), the 16-bit PCM audio signals for eight channels $CH_1$ to $CH_8$, are recorded each on one track, and, in the format M(medium), the 16-bit PCM audio signals for four channels $CH_1$ to $CH_4$, are recorded each on two tracks separated by four tracks from each other, in such a manner these signals are distributed to these two tracks. In the format S (slow), the two channels $CH_1$ and $CH_2$ are recorded on each four tracks separated by two tracks from each other, in such a manner that these two channels are distributed to these four tracks. In the format T (twin), PCM audio signals for the channels $CH_1$ and $CH_2$ are also recorded on each tracks $TD_3$, $TD_4$, $TD_7$, and $TD_8$ on which the PCM audio signals for the channels $CH_3$ and $CH_4$ should be recorded in the format M. In this manner, so called double recording is achieved.

In the recording/reproducing method according to an embodiment of the present invention, PCM audio data are recorded in a format X (extended) in which the number of bits for quantization is expanded to, for example, 20 to 24 bits, while compatibility is maintained with respect to the aforementioned pre-existing formats.

In the present embodiment, a unit data is constituted by standard data SD of m bits and expansion data ED of n bits. In the following description, a unit data of 24 bits is considered where m is set to 16 and n to 8. The standard data SD is allocated to 16 upper order bits of 20-bit audio data. The 8-bit expansion data ED are further allocated to expansion audio data LD forming the four lower order bits of 20 bits audio data and 4-bit auxiliary data XD so that the data unit of 24 bits is formed by 20-bit audio data (SD+LD) to which 4-bit auxiliary data XD are annexed.

When the auxiliary data XD are not required, the totality of the 8-bit expansion data ED may be used as the expansion audio data LD, for expanding the dynamic range to provide the audio data of 24 bits while the association with the 16-bit standard audio data SD is maintained with the MSB of the audio data as the clip level.

In the following embodiment, 20-bit PCM audio signals of two channels, such as left and right channels for the stereophonic audio signals, are considered. The PCM audio signals of 20 bits per sample are constituted by standard audio data of 16 upper order bits corresponding to the standard data SD and expansion audio data of 4 lower order bits corresponding to the expansion data LD. The unit data includes the 4-bit auxiliary data XD annexed to the above data. The data constituted in this manner are recorded in a distributed fashion on six tracks, namely the tracks $TD_1$ to $TD_6$, of the eight digital audio signal tracks $TD_1$ to $TD_8$ of the magnetic tape MT.

Figure 5:
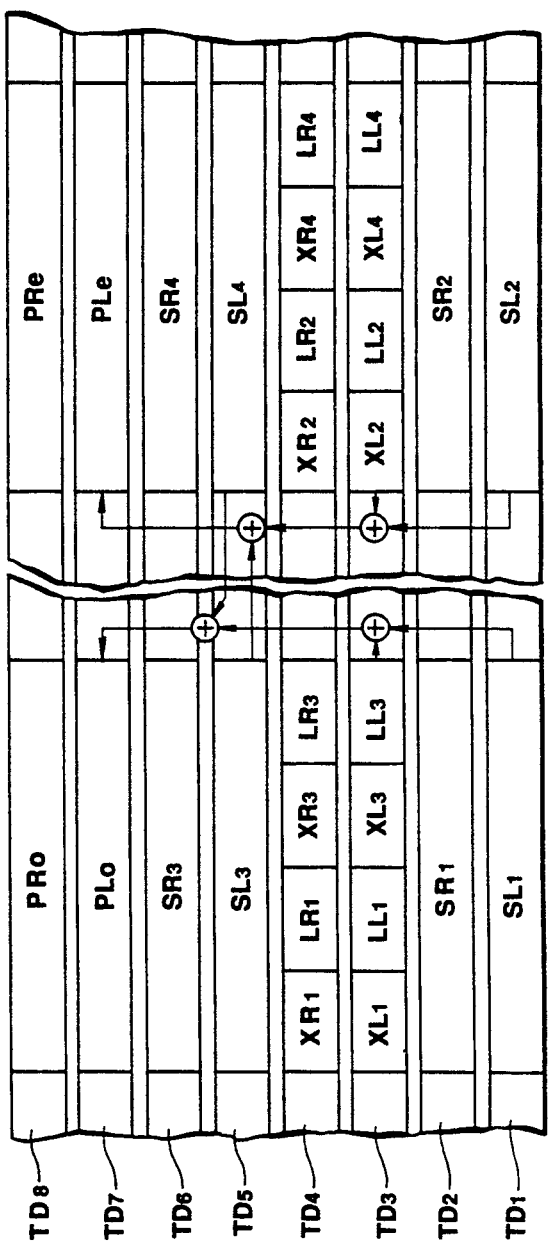
FIG. 5 is a diagrammatic view showing the manner of track assignment of each data in the recording/reproducing mehtod for digital signals according to the present invention.

In FIG. 5, only the digital audio signal tracks $TD_1$ to $TD_8$ of the multiple tracks shown in FIG. 1 and only the continuous four samples of the PCM audio data and auxiliary data are shown.

Similarly to the aforementioned formats M and T, the standard audio data SL of the upper order 16 bits for the left channel are recorded on digital audio signal tracks $TD_1$ and $TD_5$ as each one word, while the standard audio data SR of the upper order 16 bits of the right channel are recorded on digital audio signal tracks $TD_2$ and $TD_6$ as each one word. The input word sequence of each channel, for example, $SL_1$, $SL_2$, $SL_3$, $SL_4$, $SL_5$, $SL_6$, $SL_7$, $SL_8$, for left channel, is converted into two tracks, e.g. $TD_1$ and $TD_5$, as the word sequence shown in Table 2, and interleaved as shown in FIG. 3. The same may apply for the digital audio signal tracks $TD_2$ and $TD_6$ on which the digital audio signals for the right channel are recorded This word sequence applies for the formats M and T, as long as these tracks are concerned.

TABLE 2

| track $TD_1$ | $SL_1$ | $SL_2$ | $SL_3$ | $SL_6$ | ... |
|---|---|---|---|---|---|
| track $TD_5$ | $SL_5$ | $SL_4$ | $SL_7$ | $SL_8$ | ... |
| track $TD_2$ | $SR_1$ | $SR_2$ | $SR_5$ | $SR_6$ | ... |
| track $TD_6$ | $SR_3$ | $SR_4$ | $SR_7$ | $SR_8$ | ... |

The expansion audio data LL of the lower order 4 bits and the 4-bit auxiliary data XL, for the left channel from two data units, are recorded, each as one word, on the digital audio signal track $TD_3$. Similarly, the expansion audio data LR of the 4 lower order bits and the 4-bit auxiliary data XR, for the right channel from two data units, are recorded, each as one word, on the digital audio signal track $TD_4$. In this case, the sequence in which these two-unit data are included and the sequence in which the two-unit data are actually recorded are the same with the sequence in which the standard audio data are recorded, in such a manner that the expansion audio data LD and the auxiliary data XD of the unit data including the standard audio data SD existing at the same time are combined and recorded.

As shown in FIG. 5, a 16-bit parity data $PL_o$ is obtained from three words, that is, the standard audio data $SL_1$ recorded on the digital audio signal track $TD_1$, the expansion audio data $LL_1$ and $LL_3$ and the auxiliary data $XL_1$ and $XL_3$ recorded on the digital audio signal track $TD_3$ and the standard audio data $SL_4$ recorded on the digital audio signal track $TD_5$ at different timing, and is recorded on the digital audio signal track $TD_7$ at the time of recording of the standard audio data $SL_1$. Similarly, a 16-bit parity data $PL_e$ is obtained from three words, that is, from the standard audio data $SL_2$, and $SL_3$ and the expansion audio data $LL_2$ and $LL_4$ and auxiliary data $XL_2$ and $XL_4$ and the standard audio data $SL_3$ recorded on the digital audio signal track $TD_5$ at different timing, and is recorded on the digital audio signal track $TD_7$ at the time of recording of the standard audio data $SL_2$. As for the right channel, a parity data $PR_o$ is obtained from three words, that is, the standard audio data $SR_1$ and $SR_4$, and the expansion audio data $LR_1$ and $LR_3$ and auxiliary data $XR_1$ and $XR_3$, and is recorded on the digital audio signal track $TD_8$. Similarly, a parity data $PL_e$ is obtained from three words, that is, standard audio data $SR_2$ and $SR_3$ and expansion audio data $LR_2$ and $LR_4$ and auxiliary data $XR_2$ and $XR_4$, and is recorded on the digital audio signal track $TD_8$.

The above processing is repeated at intervals of four data units.

It should be noted that, as shown in FIG. 5, the standard audio data $SL_1$ and $SL_3$ and the standard audio data $SL_2$ and $SL_4$ are recorded at a distance of K blocks from each other, since they are previously subjected to interleaving at the time of the error correction coding, as shown in FIG. 3.

In this manner, a parity is generated and recorded from the data lying across plural tracks, so that, even when one track data cannot be reproduced due to, for example, head clogging, it can be reconstituted from the data and the parity reproduced from other tracks.

Also, in case a dropout has occurred across plural tracks along the tape width, as a result of splice editing, for example, the respective parity series are interleaved so that, for example, the above parity data $PL_o$ is generated from the above standard audio data $SL_1$ and $SL_4$ and the expansion audio data $LL_1$ and $LL_3$, so that the number of samples of the data that may be reconstituted by correction may be increased and a higher sound quality may be maintained. The above interleaving is not mandatory and may be omitted, if so desired.

Next, by referring to FIGS. 6 and 7, a typical recording/reproducing apparatus to be used in the recording method shown in the preceding embodiment, will be explained in more detail.

Figure 6:
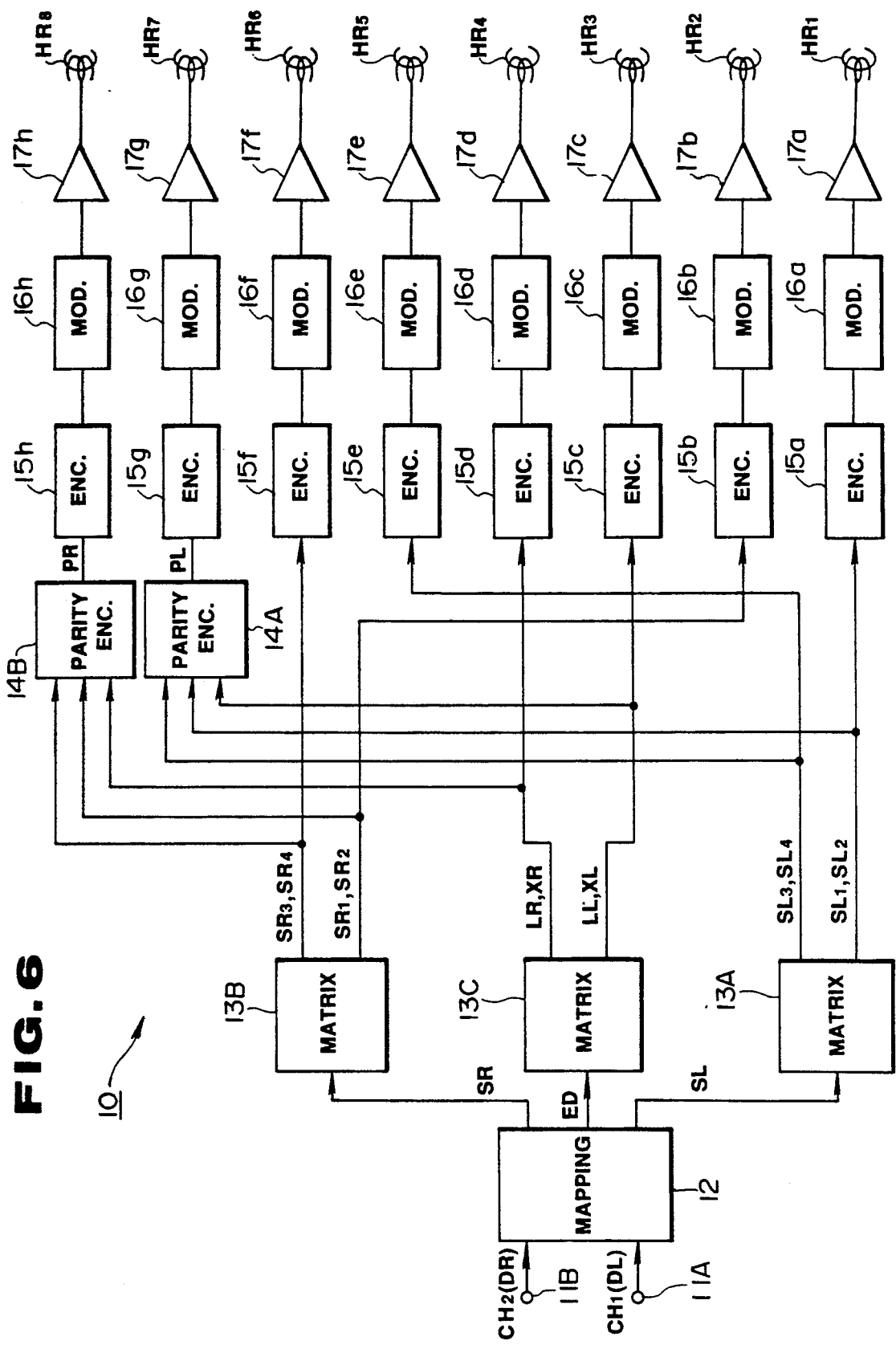
FIG. 6 is a block diagram showing a recording circuit for recording the digital signals in accordance with the track assignment shown in FIG. 6.

In a recording circuit 10 shown in FIG. 6, data units DL and DR for the left and right channels are supplied to input terminals 11A and 11B. In a mapping circuit 12, connected to these input terminals 11A and 11B, the standard audio data SL, expansion audio data LL and the auxiliary data XL are separated from the left channel unit data DL, while the standard audio data SR, expansion audio data LR and the auxiliary data XR are separated from the right channel unit data DR. Three matrix circuits 13A, 13B and 13C are connected to the mapping circuit 12. The matrix circuit 13A is supplied with the standard audio data SL for the left channel and sequentially outputs data at the two outputs in accordance with the word sequence shown in Table 2. The matrix circuit 13B is supplied with the standard audio data SR for the right channel and sequentially outputs data at the two outputs in accordance with the word sequence shown in Table 2. The expansion audio data LL and LR and auxiliary data XL and XR for the left and right channels is supplied to the matrix circuit 13C and alternately output at the two outputs, as shown in FIG. 5.

A parity encoder 14A, connected to the matrix circuits 13A and 13C, is supplied with the standard audio data SL, expansion audio data LL and the auxiliary data XL for the left channel, and generates a parity data PL from the interleaved data shown in FIG. 5 by, for example, a modulo-2 addition, that is, an exclusive-OR addition.

A parity encoder 14B, connected to the matrix circuits 13B and 13C, is supplied with the standard audio data SR, expansion audio data LR and auxiliary data XR for the right channel, and generates a parity data PR from the interleaved data shown in FIG. 5, similarly to the left channel described above.

The 16-bit data words from the matrix circuits 13A, 13B and 13C and the 16-bit parity words from the parity encoders 14A and 14B are supplied to error correction encoders 15a to 15h, in accordance with track assignment shown in FIG. 5, so that parity words P and Q shown in FIG. 3 are separately generated for each of the digital audio signal tracks $TD_1$ to $TD_8$, at the same time that an interleaving operation is performed. When the parity words P and Q are generated for data recorded on the digital audio signal tracks $TD_3$, $TD_4$, $TD_7$ and $TD_8$, an offset data is advantageously added to each of the calculation of the parity words P and Q in the above formats M and T, so that the format X can be discriminated at the time of reproduction.

The error correction encoders 15a to 15h are connected separately to modulating circuits 16a to 16h.

In these modulating circuits 16a to 16h, the sync signals shown in FIG. 2B are annexed to the 16-word data supplied from the encoders 15a to 15h and the CRCC is also generated by an arithmetic operation and annexed to the data to constitute a block shown in FIG. 2A for outputting recording signals modulated in accordance with a predetermined modulation rule.

In this case, as for the data for the above digital audio signal tracks $TD_3$, $TD_4$, $TD_7$ and $TD_8$, the sync pattern included in the sync signals may be changed from that shown in FIG. 2B, e.g. by using a distance between the transitions of 5.0 T and 4.0 T, or an offset may be afforded in the arithmetic operation for the CRCC to provide for format discrimination at the time of reproduction.

The recording signals outputted from the modulating circuits 16a to 16h are supplied via recording amplifiers 17a to 17h to recording heads $HR_1$ to $HR_8$ so as to be recorded as the digital audio signals $TD_1$ to $TD_8$ on the magnetic tape MT.

In the above recording circuit 10, no marked time delay is produced when the parity encoders 14A and 14B are constituted by exclusive- OR circuits. However, when the circuit construction is such that time delay may be produced, timing adjustment circuits may also be provided, if so desired.

Figure 7:
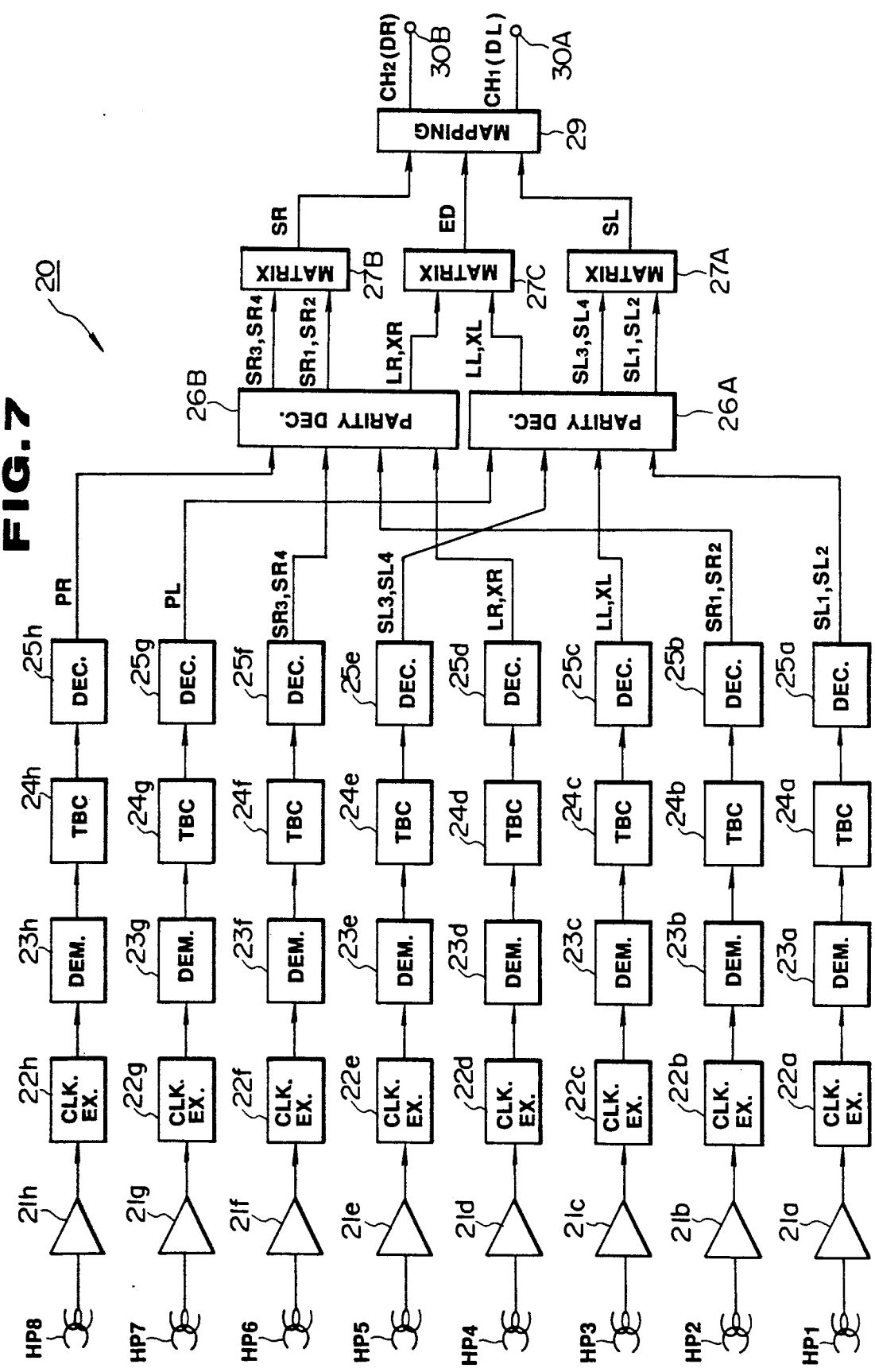
FIG. 7 is a block diagram showing a reproducing circuit for reproducing digital signals recorded by the recording circuit shown in FIG. 6.

In a reproducing circuit 20, shown in FIG. 7, signals reproduced from digital audio signal tracks $TD_1$ to $TD_8$ of the magnetic tape MT by reproducing heads $HP_1$ to $HP_8$ are supplied by reproducing amplifiers 21a to 21h to clock extracting circuits 22a to 22h.

In the clock extracting circuits 22a to 22h, the reproduced signals are waveformed into digital signals and the thus produced digital signals are supplied to demodulating circuits 23a to 23h, at the timing of clocks extracted from the reproduced signals.

In the demodulating circuits 23a to 23h, block synchronization is achieved by the sync signals shown in FIG. 2B.

If, at the time of recording, the sync pattern shown in FIG. 2B is applied to signals recorded on the digital audio signal tracks $TD_1$, $TD_2$, $TD_5$ and $TD_6$, and the sync pattern modified as described above is applied to signals recorded on the digital audio signal tracks $TD_3$, $TD_4$, $TD_7$ and $TD_8$, the signals reproduced from the tracks $TD_1$, $TD_2$, $TD_5$ and $TD_6$ are synchronized, whether they are recorded by the format M, format T or the format X. However, the signals reproduced from the tracks $TD_3$, $TD_4$, $TD_7$ and $TD_8$ are synchronized only when they are recorded by the format X, while the signals recorded by the formats M and T are rejected without being erroneously reproduced to act as noise. Similarly, signals recorded by the format X are rejected by the reproducing systems designed for the format M or T.

The signals for which block synchronization is achieved are subjected to the modulating process at the modulating circuits 16a to 16h at the time of recording. For the demodulated signals, error detection is performed with respect to the 16-word data and the block address included in the block on the basis of the CRCC annexed to the block with respect the to modulated signals. In this case, when the offset is added at the recording time in the course of the arithmetic operation of the CRCC, the same offset is added at the time of decoding the CRCC at the demodulating circuits 23a to 23h, so that the signals recorded by the formats M and T are detected as errors and rejected. Similarly, signals recorded by the format X are rejected by the reproducing systems designed for the format M or T.

The demodulated data output from the demodulating circuits 23a to 23h are supplied to time base correction circuits (TBC) 24a to 24h, respectively.

To these time base correction circuits 24a to 24h, there are supplied only if the 16 words of the block only if the block address has been detected by the CRCC as containing no errors in the demodulating circuits 23a to 23h. To these time base correction circuits 24a to 24h, those 16 words which have been detected by the CRCC as containing errors are not supplied and, in their stead, error flags are supplied for the respective erroneous words.

From these time base correction circuits 24a to 24h, time base corrected 16-word data of the respective blocks and error flags are supplied to error correction decoders 25a to 25h.

In the error correction decoders 25a to 25h, the error correction codes generated at the error correction encoders 15a to 15h of the recording circuit 10 as shown in FIG. 3 are decoded. At this time, the words indicated as being erroneous by the error flags supplied from the time base correction circuits 24a to 24h are corrected to the maximum extent possible.

When the offset is added in the course of the arithmetic operation of the parity words P and Q at the recording time as mentioned above, the same offset is added at the decoding time in the above error correction decoders 25a to 25h. Hence, errors cannot be corrected for signals recorded by the formats M or T. Therefore, should many words be erroneous, these may be rejected at some later stage as by muting. If it is found by detection by the CRCC that there is no error, the error correction decoding may be performed without fail so that all words may be regarded as being erroneous and thus rejected.

The words corrected for error by the error correction decoders 25a to 25h and the words not corrected for errors and to which error flags are annexed are transmitted to parity decoders 26A and 26B, respectively.

In association with the parity encoders 14A and 14B of the aforementioned recording circuit 10, the standard audio data SL, expansion audio data LL and auxiliary audio data XL for the left channel from the error correction decoders 25a, 25e and 25c and the parity word PL from the error correction decoder 25g are supplied to the parity decoder 26A, while the standard audio data SR, expansion audio data LR and auxiliary audio data XR for the right channel from the error correction decoders 25b, 25f and 25d and the parity word PR from the error correction decoder 25h are supplied to the parity decoder 26B.

The parity decoders 26A and 26B perform an error correction with respect to the words that are supplied from the error correction decoders 25a to 25h and to which error flags are annexed. Therefore, the words that are not correctable at the error correction decoders 25a to 25h can be occasionally corrected at the parity decoders 26A and 26B, so that the correction capability as a whole may be improved.

From the parity decoders 26A and 26B, the standard auduio data SL for the left channel are entered into the matrix circuit 27A in the same sequence shown in the above Table 2 as the output sequence for the matrix circuit 13A of the recording circuit 10. The standard audio data SR for the right channel are entered into the matrix circuit 27B in the same sequence shown in the above Table 2 as the output sequence for the matrix circuit 13C of the recording circuit 10. Also the expansion audio data LL and LR and the auxiliary data XL and XR for the left and right channels are entered into the matrix circuit 27B in the same sequence as the output sequence for the matrix circuit 13C of the recording circuit 10.

The result is that the standard audio data SL for the left channel, the standard audio data SR for the right channel and the expansion audio data LL and LR and the auxiliary data XL and XR for the left and right channels, are outputted from the matrix circuits 27A, 27B and 27C, respectively, in the same sequence or the same temporary sequence as the output sequence from the mapping circuit 12 of the recording circuit 10, so as to be supplied to the mapping circuit 29.

In the mapping circuit 29, expansion audio data LL and auxiliary data XL are annexed to the standard audio data SL for the left channel to form a 24-bit unit data DL which is outputted at an output terminal 30A, at the same time that expansion audio data LR and auxiliary data XR are annexed to the standard audio data SR for the right channel to form a 24-bit unit data DR which is outputted at an output terminal 30B.

Any erroneous word that has not been corrected even in the parity decoders 26A and 26B can be interpolated at an interpolator, not shown, which is connected to circuit elements before of the output terminals 30A and 30B or to the output terminals 30A and 30B. It is, however, necessary that the auxiliary data be separated from the audio data so that only the audio data will be interpolated.

Figure 8B:
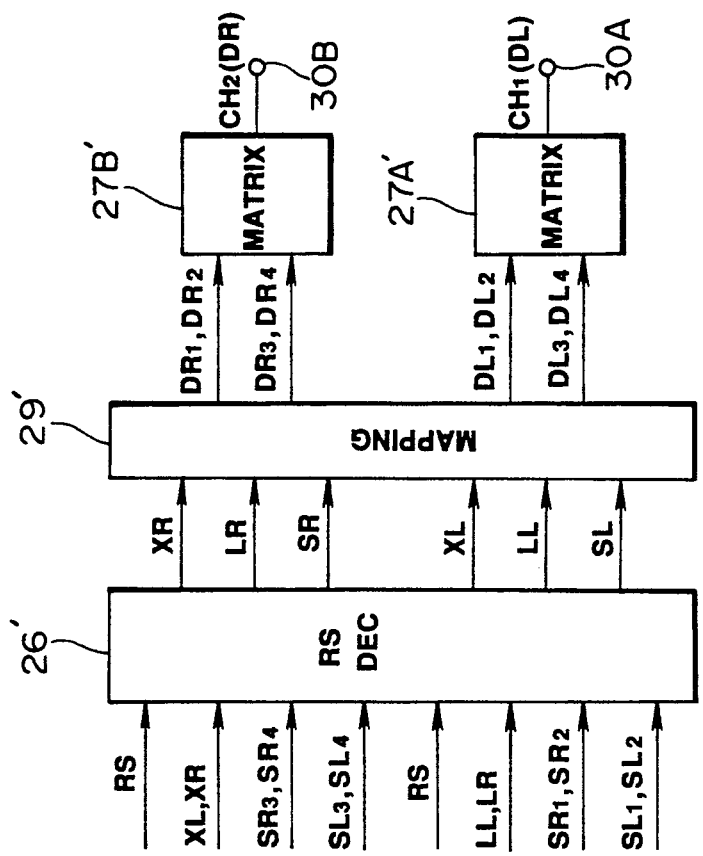
FIGS. 8A and 8B are block diagrams showing a modified embodiment of the recording/reproducing circuit for practicing the method for recording/reproducing digital signals according to the present invention.
Figure 8A:
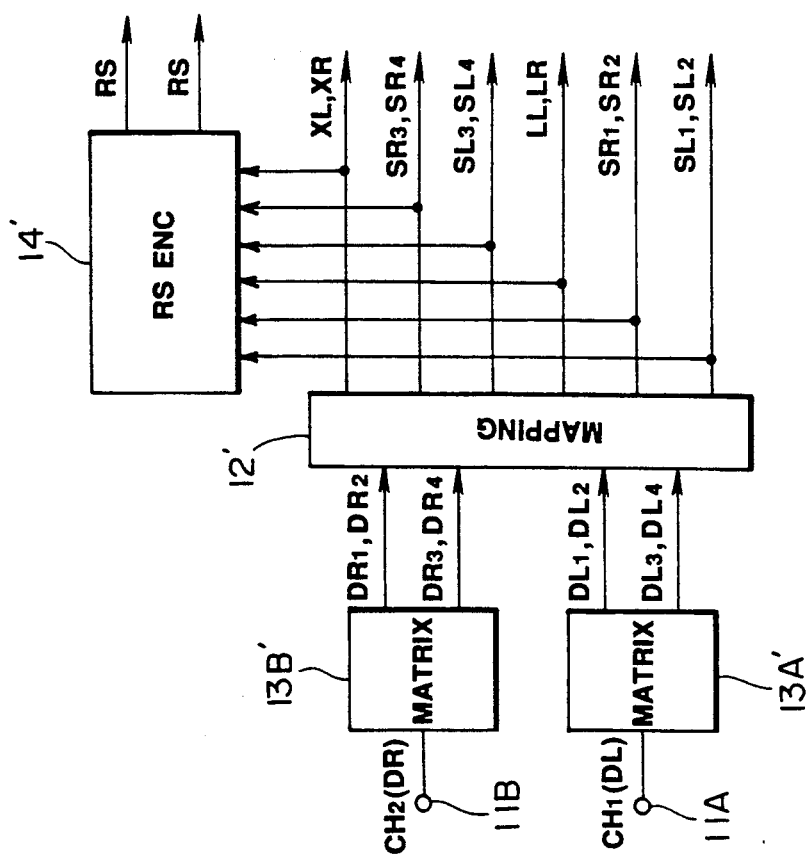

In the above described recording circuit 10 and reproducing circuit 20, the mapping circuits 12 and 29 and the matrix circuits 13A, 13B, 13C, 27A, 27B and 27C may be reversed in order of connection order as shown in FIGS. 8A and 8B so that data distribution as shown in Table 2 or data distribution in reverse manner thereof is performed with the unit data DL and DR remaining intact in matrix circuit 13A', 13B', 27A' and 27B' and standard data SD, the expansion audio data LL and LR and the auxiliary data XL and XR being separated from or connected to each other in the mapping circuits 12' and 29'.

Although separately mentioned, the above-described mapping circuit and matrix circuits can be integrated.

Figure 9:
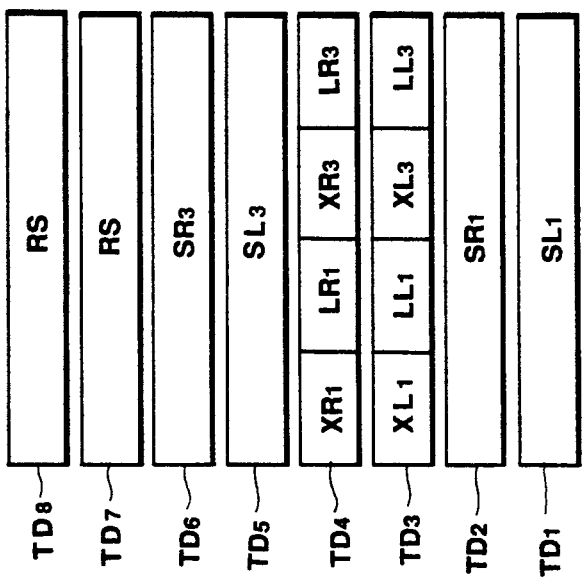

The parity encoders 14A and 14B and the parity decoders 26A and 26B may be replaced with a Reed Solomon code encoder 14' and a Reed Solomon code decoder 26' so that the data are not divided into left and right channel data but the totality of the six data words are supplied at the recording time to the Reed Solomon code encoder 14' to generate 2 parity words for recording on digital audio signal tracks $TD_7$ and $TD_8$ as shown in FIG. 9, with the 6 data words and 2 parity words being supplied at the reproducing time to the Reed Solomon code decoder 26' for performing error correction. The error correction capability may be improved significantly by making use of the Reed Solomon code.

Figure 10:
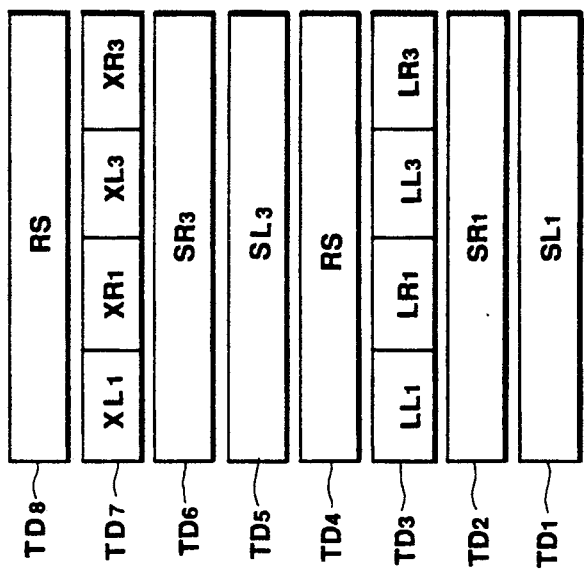
FIGS. 9 and 10 are diagrammatic views showing the manner of track assignment of each data in a method for recording/reproducing digital signals according to a modified embodiment of the present invention.

The manner of track assignment is not limited to the embodiment shown in FIG. 5 and, on the condition that the data recorded on the digital audio signal tracks $TD_1$, $TD_2$, $TD_5$ and $TD_6$ remain the same, assignment to the other tracks may be made arbitrarily. For example, as shown in FIG. 10, only the expansion audio data LL and LR for the left and right channels may be recorded collectively on the digital audio signal track $TD_3$, with only the auxiliary data XL and XR for the left and right channels being recorded collectively on the digital audio signal track $TD_7$, and with the parity data being recorded on the digital audio signal tracks $TD_4$ and $TD_8$. Although not shown, the expansion audio data LL and LR for the left and right channels may be recorded collectively on the digital audio signal track $TD_3$ in the embodiment of FIGS. 5 or 9, with the auxiliary data XL and XR for the left and right channels being recorded collectively on the digital audio signal track $TD_4$.

For format discrimination, any of the above described methods may be used alone or in combination. Besides these methods, format discrimination data may be included in the aforementioned control signal and recorded in the control signal track Tc.

The channel status (C) or the user information (U) in the AES/EBU digital audio I/O format may be recorded as the auxiliary data XL and XR. For example, the above information may be distributed sequentially to only two of the four bits of the auxiliary data $XL_1$, $XL_2$, $XL_3$, $XL_4$, . . . , and the same information may be assigned to the remaining two bits of different ones of the auxiliary data, so that the 2×2 bit information recorded on the data $XL_1$ and $XL_3$ may be double recorded on the data $XL_7$, and $XL_4$ to prevent data loss otherwise caused at the time of splice editing.

What is claimed is:

1. A method of recording a digital signal on a recording medium, where the digital signal contains words of data having more bits than can normally be accommodated by the recording medium, comprising the steps of:

receiving a channel of digital data consisting of a plurality of data words each including standard data of m bits, where m is the maximum number of bits permitted per word by the recording density of the recording medium, and extension data of n bits;

dividing each said data word into said standard data and extension data; and recording said standard data on one track on said recording medium and said extension data on another track on said recording medium.

2. The method according to claim 1, wherein said data word includes digital audio data, said standard data includes the upper order bits of said audio data and said extension data includes the lower order bits of said audio data.

3. The method according to claim 2, wherein each said data word comprises a sampling data of 20 bits, said standard data comprises the 16 upper order bits of said sampling data and said extension data comprises the 4 lower order bits of said sampling data and 4 additional bits of data for a total of 8 bits of extension data.

4. The method according to claim 1, wherein said receiving step includes the steps of receiving two channels of digital data and recording the standard data of each channel independently on at least one track and the extension data of said two channels on at least one other track.

5. A method of reproducing a digital signal from a recording medium on which a channel of digital data consisting of a plurality of data words each including standard data of m bits and extension data of n bits, where m is the maximum number of pits permitted per word by the recording density of the recording medium, is recorded, with the standard data recorded on a first track on the recording medium and the extension data recorded on a second track on the recording medium, comprising the steps of:
reproducing said standard data from the first track on said recording medium and said extension data from the second track on said recording medium;
combining said standard data and extension data into said plurality of data words; and
reconstituting the channel of said digital data consisting of said data words.

6. The method according to claim 5, wherein said plurality of data words includes digital audio data, said standard data includes the upper order bits of said audio data and said extension data includes the lower order bits of said audio data.

7. The method according to claim 6, wherein each said data word comprises a sampling data of 20 bits, said standard data comprises the 16 upper order bits of said sampling data and said extension data comprises the 4 lower order bits of said sampling data and 4 additional bits of data for a total of 8 bits of extension data.

8. The method according to claim 5, wherein the recording medium contains a second channel of digital data, with the standard data of the second channel recorded on a third track and said reproducing step includes the steps of reproducing the standard data of each of said two channels independently from the first and third tracks, respectively and the extension data from the second track.

9. A method of recording and reproducing a digital signal on a recording medium comprising the steps of:
receiving a channel of digital data consisting of a plurality of data words each including standard data of m bits, where m is the maximum number of bits permitted by word by the recording density of the recording medium, and extension data of n bits;
dividing each said data word into the standard data and extension data;
recording the standard data on a first track on the recording medium and the extension data on a second track on the recording medium;
reproducing the standard data from the first track on the recording medium and the extension data from the second track no the recording medium;
combining the standard data and extension data into the plurality of data words; and
reconstituting the channel of digital data consisting of the data words.

10. The method according to claim 9, wherein the plurality of data words includes digital audio data, the standard data includes the upper order bits of said audio data and the extension data includes the lower order bits of said audio data.

11. The method according to claim 10, wherein each data word comprises a sampling data of 20 bits, the standard data comprises the 16 upper order bits of the sampling data and the extension data comprises the 4 lower order bits of the sampling data and 4 additional bits of data for a total of 8 bits of extension data.

12. The method according to claim 9, further comprising the steps of:
receiving a second channel of digital data consisting of a plurality of data words each including standard data of m bits and extension data of n bits;
recording the standard data of the second channel on a third track on the recording medium and the extension data of the second channel on a track other than the first or third track;
reproducing the standard data of the second channel from the third track on the recording medium and the extension data of the second channel from the other track on the recording medium; and
reconstituting the second channel of digital data consisting of the data words.

* * * * *